April 3, 1934.   R. H. SCHULTZ ET AL   1,953,510
DIFFERENTIAL FRICTION DRIVE
Filed July 14, 1930   2 Sheets-Sheet 1
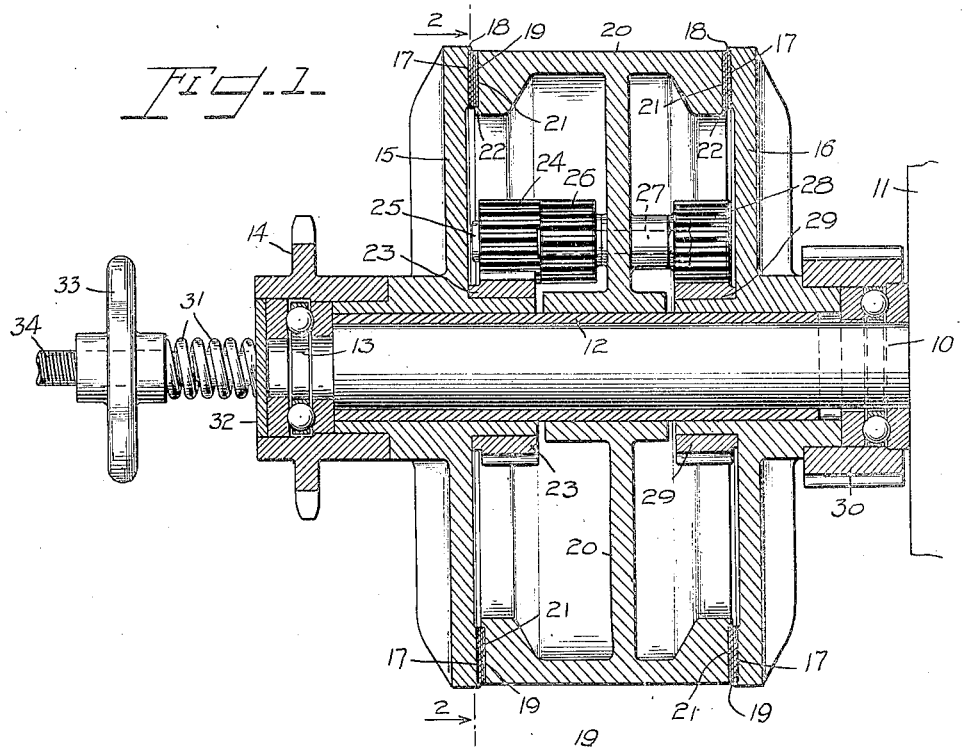
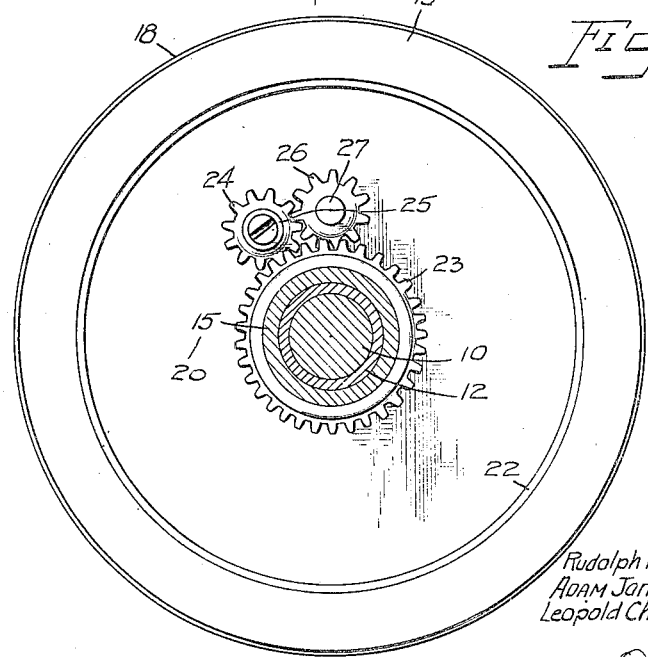
Rudolph Henry Schultz
Adam James Siebert
Leopold Charles Borloz
INVENTORS
BY
their ATTORNEY

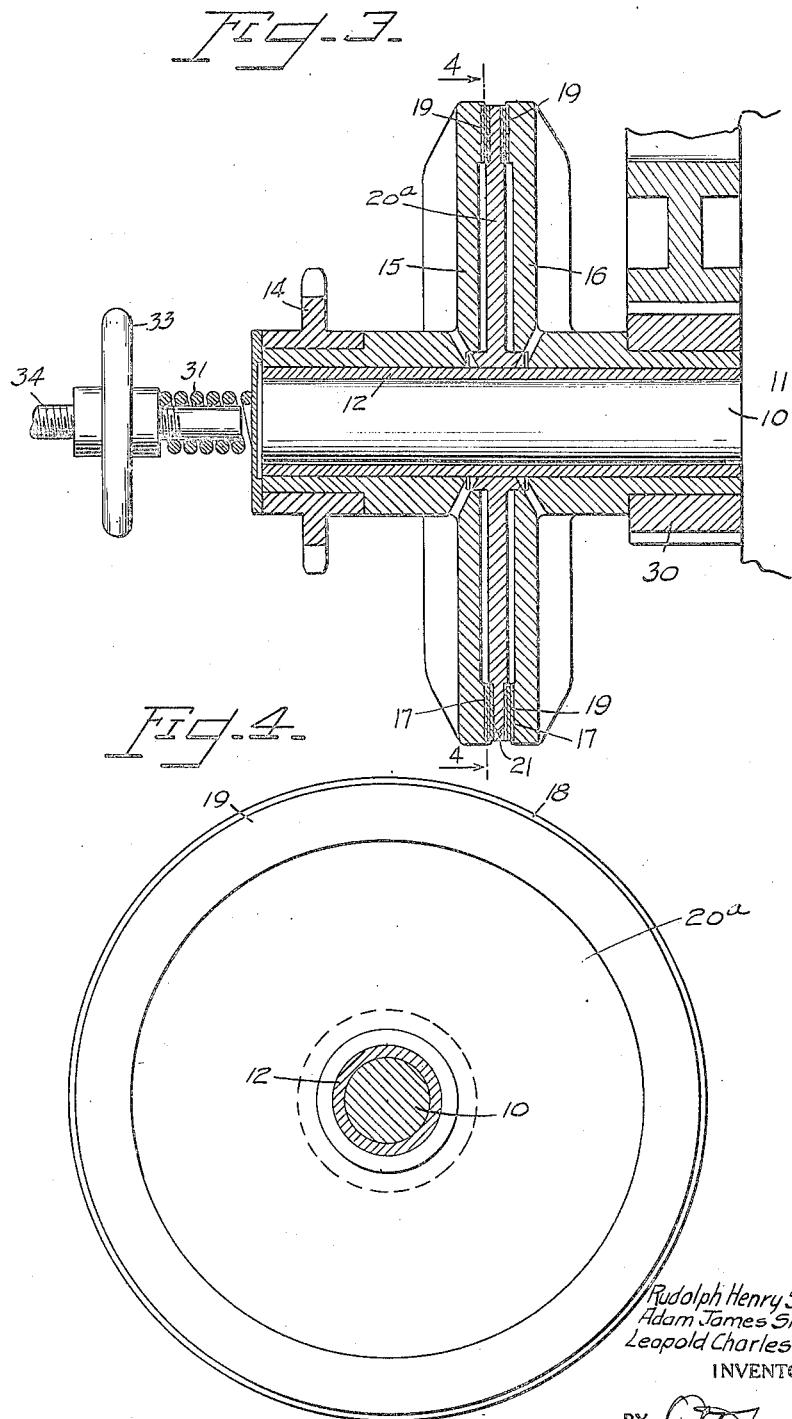

Patented Apr. 3, 1934

1,953,510

UNITED STATES PATENT OFFICE 1,953,510

DIFFERENTIAL FRICTION DRIVE

Rudolph Henry Schultz, Adam James Siebert, and Leopold Charles Borloz, Brooklyn, N. Y., assignors to Schultz Engineering Corporation, Brooklyn, N. Y., a corporation of New York Application July 14, 1930, Serial No. 467,658

4 Claims. (Cl. 64—99)

This invention relates to improvements in a differential friction drive in which a plurality of friction surfaces are introduced between the driving and driven elements and an intermediate element running at a speed proportionate to the difference between the speeds of the driving and driven elements.

A differential friction drive of this character is particularly applicable for use in connection with the take-up drive for rewinding machinery, in which the take-up roll or reel is called upon to change its rate of speed as its diameter increases. The present invention is also well adapted as a braking medium for use on the paper roll spindle of large and small printing machines, which now employ a type of brake comprising a grooved pulley and clamp operated shoes engaging the grooved pulley to control the speed of the unwinding supply roll. The braking surfaces in this type of arrangement are unable to withstand the wear for any length of time and replacement of pulleys and shoes causes considerable delay and involves large maintenance costs.

The present invention has for its object to provide a differential friction drive in which a maximum amount of friction surface is disposed between surfaces moving together or at relative speeds.

A further object of our invention is to provide a differential friction drive, comprising an intermediate element interposed between the driving and driven elements of the drive, and a differential gear train for driving the intermediate element at a fixed speed ratio relative to the speed or speeds of the driving and driven elements.

We accomplish these objects by means of our invention of which two embodiments are described in the following specification, set forth in the appended claims and illustratively exemplified in the accompanying drawings, in which, Figure 1 is a substantially longitudinal sectional view of a differential friction drive embodying a differential drive for the intermediate friction element; Figure 2 is a substantially transverse sectional view taken on lines 2—2 of Figure 1; Figure 3 is a substantially longitudinal sectional view of a modification of our improved friction drive; and Figure 4 is a substantially transverse sectional view of the same taken on lines 4—4 of Figure 3.

Referring to the drawings and particularly to Figures 1 and 2, 10 denotes a fixed stud or shaft projecting from the frame 11 of the machine to which the friction drive has been applied. A bushing 12 is mounted for rotation about the stud 10, the bushing projecting from the outer end of the stud to a point short of the frame 11. A thrust bearing 13 is carried beyond the outer end of the bushing 12 and its rings support a portion of the hub of a drive gear or sprocket 14, the inner portion of the hub being connected to or forming an integral part of a driving disc 15, the hub of which bears loosely upon the bushing 12. At the opposite end of the bushing 12 and spaced from the drive friction disc is a similar disc 16 which is a driven member and has its hub fixed on the bushing 12. Each of the discs 15 and 16 on its inner surface is provided with an annular marginal track 17 and flange 18 to form a seat for an annular band 19 of friction material. Intermediate the two discs 15 and 16 is a differentially driven friction pulley 20 having its hub loosely bearing about the bushing 12 and its peripheral portion at the sides provided with marginal tracks 21 and inner flanges 22 which cooperate with the tracks 17 and flanges 18 and engage and carry the friction bands 19.

In accordance with the present invention and particularly with reference to the embodiment of our invention illustrated in Figures 1 and 2, there is intended to be a fixed ratio of relative movement between the intermediate pulley 20 and the driving and driven discs 15 and 16. This performance is accomplished by means of a train of gears comprising a spur gear 23 turning with the drive disc 15 and mounted on the hub thereof next to the pulley 20. In mesh with the gear 23 along substantially one-half its length, is a pinion gear 24 which is loosely mounted on a stud shaft 25 projecting from the web of the pulley 20. In mesh with the other or inner half of the pinion 24 is a second pinion gear 26 revolving with a shaft 27 bearing in the web of the pulley 20 and projecting through to the opposite side thereof to carry a pinion gear 28 which is in mesh with a spur gear 29 fixed on one end of the hub of the driven disc 16. The disc 16 on the outer end of its hub carries a driven gear or sprocket 30 which through suitable gear or chain connections, not illustrated, may be coupled with the take-up roller of a machine.

Frictional engagement between bands 19 on the discs 15 and 16 and the intermediate pulley 20, is maintained by a spring 31 co-axially disposed with respect to the axis of the thrust bearing 13 and abutting end disc 32 of the latter at one end and adjustably tensioned at the other end by means of a hand wheel 33 mounted on the threaded portion of a spindle 34 which receives its support in a fixed part of the machine, not shown, and which projects through the spring 31 to a point short of the disc 32

In operation, the rotating driving disc 15 is constantly being urged into frictional contact with the pulley 20 by the spring 31 and under normal conditions the pulley and discs are crowded along the bushing 12 so as to cause the three parts to move together through the connection made by the bands 19. When driven disc 16 is caused to drag behind the speed of the driving disc 15, due to the increase in the diameter of the take-up or rewind roller of the machine equipped with the friction drive, the pinion gears 24 and 28 will begin to revolve about their respective spur gears 23 and 29 and the difference in the speeds of the two spur gears 23 and 29 through the pinion gears 24, 26 and 28, will determine the speed of the pulley 20. The resistance offered against the rotary motion of the driving is divided up into four parts as the friction bands 19 slip on the tracks 17. The ratio of the differential gears disposed between the two discs as illustrated, cause the pulley to rotate at a speed equal to one half of the difference in speed between the two discs 15 and 16.

Referring now to Figures 3 and 4, the discs 15 and 16 are simply disposed in closer proximity to each other and the intermediate disc 20ª has no connection whatsoever between it and the discs, except the friction bands 19. In this construction the differential movement of the discs 20ª with respect to the driving and driven discs 15 and 16, will have no fixed ratio and its speed will depend merely upon the respective resistance offered by the two bands 19.

In either embodiment of the invention the so-called driving disc 15 may be a stationary unit to act as a braking power to reduce the speed of the supply roller feeding paper to a rotary printing machine and connected to the driven disc 16 through gear 30. In such a case, the braking resistance would be located on opposite faces of the bands 19 and the differential movement between the disc 16 and pulley will divide the wear into four components which insures even and effective braking with a minimum of wear.

Having now described our invention, what we claim and desire to secure by Letters Patent is:

1. In a differential friction drive, the combination of a stationary stud, a bushing loose on said stud, a driving disc loose on said bushing, a driven disc fixed on the bushing and spaced from the driving disc, an intermediate pulley loose on said bushing, friction elements interposed between the pulley and each of said discs, and a spring urging said driving disc axially towards said pulley and the latter towards the driven disc to effect a frictional engagement along the surfaces in contact with said friction elements.

2. A differential friction drive, as claimed in claim 1, including means for adjusting the tension of said spring to vary the degree of frictional engagement set up by said friction elements.

3. A differential friction drive, as claimed in claim 1, in which the adjacent marginal portions of the discs and pulley are provided with annular tracks and outer and inner flanges, and in which the friction elements comprise annular bands of friction material supported in the channels formed by the walls of the tracks and flanges.

4. A differential friction drive, the combination of oppositely disposed friction discs, one thereof being a driving member and capable of both axial and rotary motion, the other being a driven member and capable of rotary movement only, an intermediate disc disposed between the first two discs and capable of both rotary and axial movement with respect to the other discs, friction material interposed between the intermediate disc and the other discs, a bushing carrying the three discs, the driving and intermediate discs being loosely mounted and the driven disc being fixed thereon, and a stud shaft to carry said bushing, and an adjustable spring disposed to resiliently urge the discs into frictional engagement.

RUDOLPH HENRY SCHULTZ.
ADAM JAMES SIEBERT.
LEOPOLD CHARLES BORLOZ.